(12) United States Patent
Sherrell et al.

(10) Patent No.: US 12,011,726 B2
(45) Date of Patent: Jun. 18, 2024

(54) FLOTATION LINE

(71) Applicant: Metso Finland Oy, Espoo (FI)

(72) Inventors: Ian Sherrell, Columbia, MD (US); Riddhika Jain, Savage, MD (US); Reginaldo Liberato, Minas Gerais (BR)

(73) Assignee: Metso Finland Oy, Espoo (FI)

( * ) Notice: Subject to any disclaimer, the term of this patent is extended or adjusted under 35 U.S.C. 154(b) by 0 days.

(21) Appl. No.: 16/933,633

(22) Filed: Jul. 20, 2020

(65) Prior Publication Data

US 2020/0368761 A1 Nov. 26, 2020

Related U.S. Application Data

(63) Continuation of application No. PCT/FI2018/050048, filed on Jan. 23, 2018.

(51) Int. Cl.
*B03D 1/14* (2006.01)
*B03D 1/16* (2006.01)
*B03D 1/24* (2006.01)

(52) U.S. Cl.
CPC ......... *B03D 1/1406* (2013.01); *B03D 1/1456* (2013.01); *B03D 1/16* (2013.01); *B03D 1/24* (2013.01)

(58) Field of Classification Search
CPC ........ B03D 1/02; B03D 1/247; B03D 1/1406; B03D 1/1456; B03D 1/16; B03D 1/24

(Continued)

(56) References Cited

U.S. PATENT DOCUMENTS 4,737,272 A * 4/1988 Szatkowski .......... B03D 1/1406
209/164
5,167,798 A 12/1992 Yoon et al.
(Continued)

FOREIGN PATENT DOCUMENTS

CL 201900250 4/2019
CL 201900408 5/2019
(Continued)

OTHER PUBLICATIONS

Outotec flotation TankCell e-series. Finland: [online], Sep. 2016, [retrieved on May 16, 2018]. Retrieved from <http://www.outotec.com/globalassets/products/flotation/ote_outotec_tankcell_e-series_en.pdf> the whole document.
(Continued)

*Primary Examiner* — Peter Keyworth
(74) *Attorney, Agent, or Firm* — Robert P. Michal; Carter, DeLuca & Farrell LLP (57) ABSTRACT

A flotation line for treating mineral ore particles suspended in slurry is disclosed. The flotation line includes a rougher part with at least one rougher flotation cell from which overflow is arranged to flow directly into a cleaner flotation line; and a scavenger part with at least two scavenger flotation cells from which overflow is arranged to flow back into a rougher flotation cell, or into a regrinding step and then into a cleaner flotation line. Underflow from a last scavenger flotation cell is arranged to be removed from the flotation line as tailings. At least 75% of the flotation cells include a mechanical agitator including a system for introducing flotation gas into the flotation cell. At least one of the flotation cells of the flotation line includes a mechanical agitator including a microbubble generator for introducing microbubbles into the slurry.

39 Claims, 4 Drawing Sheets

(58) Field of Classification Search
USPC .................................................. 209/164–170
See application file for complete search history.

(56) References Cited

U.S. PATENT DOCUMENTS

| | | | |
|---|---|---|---|
| 5,182,014 A | | 1/1993 | Goodman |
| 2003/0111394 A1* | | 6/2003 | Schommarz ......... B03D 1/1493 |
| | | | 209/162 |
| 2008/0029459 A1 | | 2/2008 | Yamasaki et al. |
| 2013/0140218 A1* | | 6/2013 | Dobby ..................... B03D 1/20 |
| | | | 209/164 |
| 2016/0214036 A1 | | 7/2016 | Bourke |

FOREIGN PATENT DOCUMENTS

| | | |
|---|---|---|
| CL | 201902137 | 10/2019 |
| CL | 201902266 | 11/2019 |
| CL | 201902265 | 12/2019 |
| CN | 205868558 U | 1/2017 |
| CN | 104984835 B | 11/2017 |
| EP | 3743213 A4 | 9/2021 |
| FI | 125280 B | 8/2015 |
| WO | 2013169141 A1 | 11/2013 |
| WO | 2015028958 A1 | 3/2015 |
| WO | 2015162340 A1 | 10/2015 |
| WO | 2016132016 A1 | 8/2016 |
| WO | 2018033658 A1 | 2/2018 |
| WO | 2019145591 A1 | 8/2019 |

OTHER PUBLICATIONS

International Search Report issued by the Finnish Patent and Registration Office acting as the International Searching Authority in relation to International Application No. PCT/FI2018/050048 dated May 23, 2018 (6 pages).

Written Opinion of the International Searching Authority issued by the Finnish Patent and Registration Office acting as the International Searching Authority in relation to International Application No. PCT/FI2018/050048 dated May 23, 2018 (9 pages).

Office Action issued by the Eurasian Patent Office in relation to Eurasian Patent Application No. 202091634 dated Mar. 12, 2021 (2 pages) along with English language translation (2 pages).

Mesa Diego et al: "Bubble size distribution in aerated stirred tanks: Quantifying the effect of impeller-stator design", Chemical Engineering Research and Design, Elsevier, Amsterdam, NL, vol. 160, Jun. 4, 2020 (Jun. 4, 2020), pp. 356-369, XP086216276, ISSN: 0263-8762, DOI: 10.1016/J.CHERD.2020.05.029 [retrieved on Jun. 4, 2020] * figures 8-9 *.

Extended European Search Report issued by the European Patent Office in relation to European Application No. 18 81 1322.9 dated Aug. 6, 2021 (9 pages).

Office Action issued by the China National Intellectual Property Administration in relation to Chinese Application No. 201880087277.9 dated Jul. 22, 2021 (13 pages) along with English language translation (9 pages).

Office Action issued by the Australian Government IP Australia in relation to Australian Application No. 2018405394 dated Jan. 11, 2021 (5 pages).

Chilean Office Action dated Sep. 29, 2022, issued in corresponding Chilean Application No. 202001887 (16 pages) including English translation (16 pages), total 32 pages.

Search Report (Informe De Busqueda) issued by the Chilean Patent Office dated Sep. 29, 2022, issued in corresponding Chilean Application No. 202001887 (4 pages).

European Office Action issued by the European Patent Office dated Feb. 1, 2023, in corresponding EP Application No. 18 811 322.9, 4 pages.

Brazilian Office Action issued by the Federal Public Service Ministry of Economy National Institute of Industrial Property in relation to Brazilian Application No. BR112020014633-1 dated Feb. 2, 2023 (5 pages).

* cited by examiner

FLOTATION LINE

CROSS-REFERENCE TO RELATED APPLICATIONS

This application is a continuation of PCT International Application No. PCT/FI2018/050048 filed Jan. 23, 2018, the disclosure of this application is expressly incorporated herein by reference in its entirety.

TECHNICAL FIELD

The current disclosure relates to a flotation line for separating valuable metal containing ore particles from ore particles suspended in slurry. Further, the use of the flotation line, a flotation plant, and a method for separating valuable metal containing ore particles from ore particles suspended in slurry are disclosed.

SUMMARY OF THE INVENTION

A flotation line is provided for treating mineral ore particles suspended in slurry, comprising a rougher part with at least one rougher flotation cell for the separation of slurry into underflow and overflow with the help of flotation gas. The overflow from a rougher flotation cell is arranged to flow directly into a cleaner flotation line. The flotation line further comprises a scavenger part with at least two scavenger flotation cells for the separation of slurry into underflow and overflow with the help of flotation gas, wherein overflow from a scavenger flotation cell is arranged to flow back into a rougher flotation cell of the rougher part of the flotation line, or into a regrinding step and then into a cleaner flotation line. Underflow from a last scavenger flotation cell of the flotation line is arranged to be removed from the flotation line as tailings; at least 75% of the flotation cells in the flotation line comprise a mechanical agitator comprising a system for introducing flotation gas into the flotation cell; the flotation cells of the flotation line are connected in series and arranged in fluid communication; and a subsequent flotation cell is arranged to receive underflow from a previous flotation cell. The flotation line is characterized in that at least one of the flotation cells comprising a mechanical agitator comprises a microbubble generator for introducing microbubbles into the slurry.

Use of a flotation line according to the present disclosure is intended to be employed in recovering mineral ore particles comprising a valuable mineral.

The flotation plant according to the invention comprises a flotation line according to the present disclosure.

The method for treating mineral ore particles suspended in slurry comprises subjecting the slurry to a rougher flotation stage with at least one rougher flotation step wherein slurry is separated into underflow and overflow with the help of a flotation gas and wherein overflow from a rougher flotation step is led to flow directly into a cleaner flotation stage; underflow from the rougher flotation stage is led to a scavenger flotation stage with at least two scavenger flotation steps wherein slurry is separated into underflow and overflow with the help of a flotation gas; overflow from a scavenger flotation step is led to flow back into a rougher flotation step of the rougher flotation stage, or into a regrinding step and then into a cleaner flotation stage; the slurry is mechanically agitated in at least 75% of the flotation steps; the flotation steps are in series and have fluid communication; underflow from a previous flotation step is led into a subsequent flotation step; and overflow comprises a concentrate and underflow comprises tailings. The method is characterized in that microbubbles are generated into the slurry in at least one of the flotation steps in which the slurry is mechanically agitated.

With the invention described herein, the recovery if fine mineral ore particles of a flotation process may be improved. In froth flotation, upgrading the concentrate is directed to a mineral ore particle size between 10 µm to 120 µm, while recovering very coarse or very fine particles is challenging, as in a traditional mechanical flotation cell circuit or line, fine particles are lost in the tailings. Typically in froth flotation, flotation gas is introduced into a flotation cell or tank via a mechanical agitator. The thus generated flotation gas bubbles have a relatively large size range, typically from 0.8 to 2.0 mm and are not particularly suitable for collecting mineral ore particles having a finer particle size.

Traditionally, fine particle recovery has been improved by using column flotation cells, in which the lack of mechanical agitation and introduction of wash water from the top of the cell minimize ore particle entrapment in the froth. In column cells, slurry comprises recirculate from the bottom of the cell, pumped into a sparger where bubbles become attached to the mineral ore particles. The thus formed flotation gas bubble-ore particle agglomerates are the injected back to the flotation cell, where the bubbles rise to the froth layer. However, column cells are typically restricted to use in cleaner flotation lines or circuits, where the amount of solid material in the slurry is considerably lower than in a typical rougher flotation line or circuit. Forwarding the slurry between any neighboring column cells requires pumping, which effectively detaches the mineral ore particles from the flotation gas bubbles, and thus decreases the residence time of mineral ore particle-flotation gas bubble agglomerates within the flotation cell. Further, feed rate of a column flotation cell, as well as the solid material amount in the slurry to be treated must be lower than in a mechanical flotation cell to prevent settling of mineral ore particles into the bottom of the flotation cell.

In contrast, a mechanical flotation cell is typically used in a line or circuit comprising a bank of such cells, and used mostly in rougher or scavenger flotation, as well as cleaner flotation. A mechanical flotation cell comprises a mechanical agitator, typically a rotor-stator mechanism that will create the flotation gas bubbles into a mixing zone of the flotation cell. As described earlier, the relatively large flotation gas bubbles generated this way are not particularly efficient in catching or trapping fine mineral ore particles. Therefore, to enhance the recovery of these fine mineral ore particles, it is advantageous to introduce microbubbles into the flotation cell, the microbubbles being efficient in trapping the finer particles and thus improving the recovery of the finer particles into the concentrate. Typically, microbubbles have a bubble size distribution of 1 µm to 1 mm.

By introducing microbubbles directly into a mechanical flotation cell, the residence time of the microbubble-fine mineral ore particle agglomerates within the flotation line may be increased. This residence time may further be improved by arranging the flow of slurry, that is underflow of one flotation cell as infeed into the next flotation cell, to be led by gravity so that pumping that would break the microbubble-ore particle agglomerates is not needed. This may improve the overall recovery so that little valuable material ends in the final tailings in the rougher and/or scavenger flotation parts of the flotation line.

With the invention described herein, the focus of treatment of slurry may be shifted to an efficient separation of valueless fraction from the ore particles and recovering a maximal amount of valuable particles. In other words, ore particles comprising very small or even minimal amounts of valuable material may be recovered for further processing/treatment. This may be especially beneficial for ores of poor quality, i.e. ores with very little valuable material initially, for example from poor mineral deposits which may have previously been considered economically too insignificant to justify utilization. Even very fine mineral ore particles that would normally escape from being entrapped and led into the concentrate may be recovered instead of ending up in the final tailings.

In the beginning or forward end of the flotation line, it is possible to recover high grade of ore particle comprising valuable mineral, whereas the end of the flotation line may be utilized for recovering as much as possible of the ore particles comprising even a small amount of the valuable mineral, and even the smaller, finer particles may be recovered. The flotation line according to the invention ensures efficient overall recovery of ore particles comprising valuable mineral, thus providing significant advantages over the state of the art.

The flotation line, its use, the flotation plant, and the flotation method according to the invention has the technical effect of allowing the flexible recovery of various particle sizes, as well as efficient recovery of valuable mineral containing ore particles from poor ore raw material with relatively low amounts of valuable mineral initially. The advantages provided by the structure of the flotation line allow the accurate adjustment of the flotation line structural parameters according to the target valuable material at each installation.

According to some embodiments of the invention, the flotation line may be arranged in a stepwise fashion, so that at least some of the flotation cells (i.e. the bottoms of the flotation cells), either in the rougher part or in the scavenger part, or both, are positioned at different levels: for example, the bottom of the first rougher flotation flotation cell may be arranged higher than the bottom of the following rougher and/or scavenger flotation cell(s). In that way, the slurry surface level of at least some of the flotation cells following the first rougher flotation cells is lower, thus creating a step between any two subsequent flotation cells in direct fluid connection with each other. The thus-created step allows achieving a hydrostatic head or hydrostatic pressure differential (hydraulic gradient) between the two subsequent flotation cells, whereby the flow of slurry from one cell to the next may be realized by gravitational force, without any separate pumps. The hydraulic gradient forces the flow of slurry towards the tailings outlet or outlets of the flotation line. This may reduce the need for additional pumping. Further, pumping power requirement might be reduced as material flow is directed downstream gravitationally due to drop in slurry surface levels. This can apply even to embodiments in which the slurry surface levels of adjacent flotation cells in the flotation line are at one level. In addition to the already-described advantage of maintaining the microbubble-ore particle agglomerates and increasing their residence time within the flotation line, the decreased need of energy-intensive pumping will lead to savings in energy consumption, as well as simplified construction of the flotation operation, and to less need of space for the construction.

It is also conceivable to arrange the flotation line so that at least some, or all flotation cells (i.e. the bottoms of the flotation cells) are on same level. This may increase construction speed, simplify planning and construction and thus reduce costs. This so-called uniplanarity of flotation cells or the flotation line might offer advantages through reduction of investment costs, as setting up a plant requires less ground work and less space. This might be especially advantageous when the flotation cell size is increased. This again, might be desirable from the perspective of optimizing process performance while reducing capital costs for the investment.

In this disclosure, the following definitions are used regarding flotation.

Flotation involves phenomena related to the relative buoyancy of objects. Flotation is a process for separating hydrophobic materials from hydrophilic materials by adding flotation gas, for example air, to the process. Flotation could be made based on natural hydrophobic/hydrophilic difference or based on hydrophobic/hydrophilic differences made by addition of a surfactant or collector chemical. Gas can be added to the feedstock subject of flotation (slurry or pulp) by a number of different ways.

Basically, flotation aims at recovering a concentrate of ore particles comprising a valuable mineral. By concentrate herein is meant the part of slurry recovered in overflow led out of a flotation cell. By valuable mineral is meant any mineral, metal or other material of commercial value.

Flotation involves phenomena related to the relative buoyancy of objects. The term flotation includes all flotation techniques. Flotation can be for example froth flotation, dissolved air flotation (DAF) or induced gas flotation. Froth flotation is a process for separating hydrophobic materials from hydrophilic materials by adding gas, for example air, to process. Froth flotation could be made based on natural hydrophilic/hydrophobic difference or based on hydrophilic/hydrophobic differences made by addition of a surfactant or collector chemical. Gas can be added to the feedstock subject of flotation (slurry or pulp) by a number of different ways.

By a flotation line herein is meant an assembly comprising a number of flotation cells or flotation units that are arranged in fluid connection with each other for allowing either gravity-driven or pumped slurry flow between flotation cells, to form the flotation line. The flotation line is meant for treating mineral ore particles suspended in slurry by flotation. Thus, valuable metal-containing ore particles are recovered from ore particles suspended in slurry. Slurry is fed through a feed inlet to the first flotation cell of the flotation line for initiating the flotation process. The flotation line may be a part of a larger flotation plant containing one or more flotation lines. Therefore, a number of different pre-treatment and post-treatment devices or stages may be in operational connection with the components of the flotation line, as is known to the person skilled in the art.

In a flotation line a number of flotation cells are arranged in fluid connection with each other so that the underflow of each preceding flotation cell is directed to the following or subsequent flotation cell as a infeed until the last flotation cell of the flotation line, from which the underflow is directed out of the line as tailings or reject flow. In connection with the method for flotation according to the present invention, by flotation herein is meant the entire flotation process taking place in a flotation line.

The flotation cells in a flotation arrangement are fluidly connected to each other. The fluid connection may be achieved by different lengths of conduits such as pipes or tubes, the length of the conduit depending on the overall physical construction of the flotation arrangement.

Alternatively, the flotation cells may be arranged in direct cell connection with each other. By direct cell connection herein is meant an arrangement, whereby the outer walls of any two subsequent flotation cells are connected to each other to allow an outlet of a first flotation cell to be connected to the inlet of the subsequent flotation cell without any separate conduit. A direct contact reduces the need for piping between two adjacent flotation cells. Thus, it reduces the need for components during construction of the flotation line, speeding up the process. Further, it might reduce sanding and simplify maintenance of the flotation line.

The fluid connection between flotation cells or flotation units may be direct, i.e. the two flotation cells of the flotation line may be immediately adjacent to each other. Alternatively, the two flotation cells may be positioned at a distance from each other and connected through a pipe, channel or other means known in the art. The fluid connection between flotation cells may comprise various regulation mechanisms.

By direct fluid communication herein is meant that any two neighboring or adjacent or adjoining flotation cells are so connected that there are no additional process steps such as grinding arranged in between any two flotation cells or flotation stages. This is not to be mixed up with the definition of direct cell connection as described above.

By "neighboring", "adjacent", or "adjoining" flotation cell herein is meant the flotation cell immediately following or preceding any one flotation cell, either downstream or upstream.

By a flotation cell is herein meant a tank or vessel in which a step of a flotation process is performed. A flotation cell is typically cylindrical in shape, the shape defined by an outer wall or outer walls. The flotation cells regularly have a circular cross-section. The flotation cells may have a polygonal, such as rectangular, square, triangular, hexagonal or pentagonal, or otherwise radially symmetrical cross-section, as well. The number of flotation cells may vary according to a specific flotation arrangement and/or operation for treating a specific type and/or grade of ore, as is known to a person skilled in the art. In connection with the method for flotation according to the present invention, by flotation step herein is meant the flotation process taking place in one flotation cell.

The flotation cell may be a froth flotation cell, such as a mechanically agitated cell or tank cell, or a dual flotation cell. In a dual flotation cell, the cell comprises at least two separate vessels, a first mechanically agitated pressure vessel with a mixer and a flotation gas input, and a second vessel with a tailings output and an overflow froth discharge, arranged to receive the agitated slurry from the first vessel.

The flotation cell may also be an overflow flotation cell operated with constant slurry overflow. In an overflow flotation cell, the slurry is treated by introducing flotation gas bubbles into the slurry and by creating a continuous upwards flow of slurry in the vertical direction of the first flotation cell. At least part of the valuable metal containing ore particles are adhered to the gas bubbles and rise upwards by buoyancy, at least part of the valuable metal containing ore particles are adhered to the gas bubbles and rise upwards with the continuous upwards flow of slurry, and at least part of the valuable metal containing ore particles rise upwards with the continuous upwards flow of slurry. The valuable metal containing ore particles are recovered by conducting the continuous upwards flow of slurry out of the at least one overflow flotation cell as slurry overflow. As the overflow cell is operated with virtually no froth depth or froth layer, effectively no froth zone is formed on the surface of the pulp at the top part of the flotation cell. The froth may be non-continuous over the cell. The outcome of this is that more valuable mineral containing ore particles may be entrained into the concentrate stream, and the overall recovery of valuable material may be increased.

The flotation cell comprises a mechanical agitator for agitating the slurry to keep it in suspension. By a mechanical agitator is herein meant any suitable means for agitating slurry within the flotation cell. The mechanical agitator may comprise a rotor-stator with a motor and a drive shaft, the rotor-stator construction arranged at the bottom part of the flotation cell.

By overflow herein is meant the part of the slurry collected into the launder of the flotation cell and thus leaving the flotation cell as concentrate. Overflow may comprise froth, froth and slurry, or in certain cases, only or for the largest part slurry.

By underflow herein is meant the fraction or part of the slurry which is not floated into the surface of the slurry in the flotation process. Underflow is a reject flow leaving a flotation cell via an outlet which typically is arranged in the lower part of the flotation cell. Eventually the underflow from the final flotation cell of a flotation line may leave the entire arrangement as a tailings flow or final residue of a flotation plant.

By downstream herein is meant the direction concurrent with the flow of slurry (forward current, denoted in the figures with arrows), and by upstream herein is meant the direction countercurrent with or against the flow of slurry.

By concentrate herein is meant the floated part or fraction of slurry of ore particles comprising a valuable mineral. A first concentrate may comprise ore particles comprising one valuable mineral, where as a second concentrate may comprise ore particles comprising another valuable mineral. Alternatively, the distinctive definitions first, second, may refer to two concentrate of ore particles comprising the same valuable mineral but two distinctly different particle size distributions.

By a rougher flotation, rougher part of the flotation line and/or rougher cells herein is meant a flotation stage that produces a rougher concentrate. The objective is to remove a maximum amount of the valuable mineral at as coarse a particle size as practical. Complete liberation is not required for rougher flotation, only sufficient liberation to release enough gangue from the valuable mineral to get a high recovery. The primary objective of a rougher stage is to recover as much of the valuable minerals as possible, with less emphasis on the quality of the concentrate produced.

The rougher concentrate is normally subjected to further stages of cleaner flotation in a rougher cleaner flotation line to reject more of the undesirable minerals that have also reported to the froth, in a process known as cleaning. The product of cleaning is known as cleaner concentrate or final concentrate.

Rougher flotation is often followed by scavenger flotation that is applied to the rougher tailings. By a scavenger flotation, a scavenger part of the flotation line and/or a scavenger cell is meant a flotation stage wherein the objective is to recover any of the valuable mineral material that was not recovered during the initial rougher stage. This might be achieved by changing the flotation conditions to make them more rigorous than the initial roughing, or, in some embodiments of the invention, by the introduction of microbubble into the slurry. The concentrate from a scavenger cell or stage could be returned to the rougher feed for re-floating or directed to a regrinding step and thereafter to a scavenger cleaner flotation line.

By cleaner flotation, a rougher/scavenger cleaner line and/or a cleaner cell is meant a flotation stage wherein the objective of cleaning is to produce as high a concentrate grade as possible.

By pre-treatment and/or post-treatment and/or further processing is meant for example comminution, grinding, separation, screening, classification, fractioning, conditioning or cleaning such a cleaner line, all of which are conventional processes as known to a person skilled in the art.

By microbubbles herein is meant flotation gas bubbles falling into a size range of 1 μm to 1.2 mm, introduced into the slurry by a specific microbubble generator. In particular, the microbubbles are introduced into the slurry outside the normal mixing zone or area of high shear forces within the flotation cell, tank or vessel. More specifically, depending on the manner in which the microbubble generator is arranged, the majority of the microbubbles fall within a specific size range. For example, with microbubbles created by a jetting sparger, a majority of the microbubbles fall into a size range of 0.5 to 1.2 mm. For example, microbubbles created by a Venturi sparger, a majority of the microbubbles fall into a size range of 0.3 to 0.9 mm.

In contrast, "normal" flotation gas bubbles utilized in froth flotation display a size range of approximately 0.8 to 2 mm, and are introduced into the slurry by or via a mechanical agitator or by/via flotation gas inlet(s) outside the mechanical agitator. Furthermore, these flotation gas bubbles may have a tendency to coalesce into even larger bubbles during their residence in the mixing zone where collisions between mineral ore particles and flotation gas bubbles, as well as only between flotation gas bubbles take place. As microbubbles are introduced into a flotation cell outside the turbulent mixing zone, such coalescence is not likely to happen with microbubbles, and their size may remain smaller throughout their residence in the flotation cell, thereby affecting the ability of the microbubble to catch fine ore particles.

Therefore, in the context of the invention, it is to be understood that microbubbles are not only characterized by their specific size or size range—which may, in some cases overlap with the size range of the flotation gas bubbles introduced into the flotation cell by/via the mechanical agitator (or, in some cases, by/via separate flotation gas inlets)—but also by the manner and location in which they are introduced into the flotation cell, that is, by the microbubble generator so that the microbubbles are introduced into the flotation cell at a height position or location within the flotation cell that is outside the mixing zone.

In an embodiment of the flotation line, overflows of the flotation cells comprise a concentrate, and underflows of the flotation cells are arranged to flow into the tailings.

In an embodiment of the flotation line, underflow from the previous flotation cell is arranged to be led into the subsequent flotation cell by gravity.

By arranging the flow of slurry be driven by gravity, the detachment of finer mineral ore particles from the microbubbles may be avoided, and the residence time of the microbubble-ore particle agglomerates increased. Further, savings in energy consumption may be achieved as no additional pumping is required to drive the slurry downstream.

By avoiding energy-intensive pumping in flotation arrangement, significant savings in energy may be achieved, while, at the same time, ensuring efficient recovery of valuable mineral material from ores of poor quality, i.e. comprising even very little valuable mineral to start with. It may be possible to produce some part of the concentration with high grade, but also, at the same time have a good overall recovery of the desired valuable mineral. Only insignificant amounts of the valuable mineral may end up in the tailing flow.

The invention at hand aims at improving the mineral recovery process, at the same time decreasing energy consumption of the process. This is made possible by utilizing the inherent flows of slurry of the process, i.e. by moving the slurry flow into retreatment in downstream flotation cells. By arranging the flotation process thus, it is possible to direct the flow of slurry by gravity. In some embodiments, the flow of slurry may also be directed by low-intensity pumping, or by a suitable combination of the two, that is, gravity and low-intensity pumping. For example, it is possible to handle the flow of slurry by a low-head pump or gravity, when the underflow from a scavenger flotation cell is arranged to flow back into a rougher flotation cell as infeed.

By low-head pump herein is meant any type of pump producing a low pressure for driving a flow of slurry downstream. Typically, a low-head pump produces a maximum head of up to 1.0 meters, i.e. may be used to drive the flow of slurry between two adjoining flotation cells with less than 30 cm difference in slurry surface level. A low-head pump may typically have an impeller for creating an axial flow.

In an embodiment of the flotation line, at least one of the flotation cells preceding the last flotation cell of the flotation line comprises a microbubble generator.

In an embodiment of the flotation line, all flotation cells preceding the last flotation cell of the flotation line comprise a microbubble generator.

In yet another embodiment of the flotation line, at least one of the scavenger flotation cells of the scavenger part of the flotation line comprises a microbubble generator.

In yet another embodiment of the flotation line, all of the scavenger flotation cells of the scavenger part of the flotation line comprise microbubble generators.

By introducing microbubbles specifically in on or more of the scavenger flotation cells, microbubble are not unnecessarily wasted on the part of the flotation process designed to recover the bigger-sized mineral ore particles, i.e. the rougher part of the flotation line. Instead, the microbubbles are directed into the part of the process where they will have the most effect on the recovery of the finer mineral ore particles that may otherwise end up in the gangue and finally in the tailings.

In an embodiment of the flotation line, the last flotation cell of the flotation line comprises a microbubble generator.

In an embodiment of the flotation line, the flotation line comprises at least three flotation cells, or 3-10 flotation cells, or 4-7 flotation cells.

In an embodiment of the flotation line, the rougher part comprises at least two rougher flotation cells, or 2-7 rougher flotation cells, or 2-5 rougher flotation cells.

In an embodiment of the flotation line, the scavenger part comprises at least two scavenger flotation cells, or 2-7 scavenger flotation cells, or 2-5 scavenger flotation cells.

Having a sufficient number of flotation cells allows the production of high grade for part of the concentrate, and at the same time, ensuring high recovery of the desired valuable mineral throughout the flotation line, thus avoiding having any of the valuable mineral ending up in the tailings flow. As much as possible of the ore particles comprising valuable mineral may be floated while still minimizing the required pumping energy to achieve this.

In an embodiment of the flotation line, the first flotation cell of the flotation line is at least 25 $m^3$ in volume, or at least 100 $m^3$ in volume.

In an embodiment of the flotation line, a second flotation cell of the flotation line is at least 25 m³ in volume, or at least 100 m³.

Utilizing flotation cells with a relatively large volumetric size increases the probability of collisions between gas bubbles created into the flotation cells for example by means of a rotor, and the particles comprising valuable mineral, thus improving the recovery rate for the valuable mineral, as well as the overall efficiency of the flotation arrangement. Larger flotation cells have a higher selectivity as more collisions between the gas bubbles and the ore particles may take place due to the longer time the slurry stays in the flotation cell. Therefore most of the ore particles comprising valuable mineral may be floated. In addition, the backdrop of buoyant ore particles may be higher, which means that ore particles comprising very low amount of valuable mineral drop back into the bottom of the flotation cell. Thus the grade of overflow and/or concentrate from larger flotation cells may be higher. In addition, in a larger flotation cell, the risk of microbubbles combining or coalescing to form agglomerates of microbubbles is lower. Further, the introduction of microbubbles into the flotation cell may be arranged to a zone or position within the flotation cell where the mixing effect of the mechanical agitator is less drastic and turbulence lower, further minimizing the above-mentioned risk of microbubble combining, but also minimizing the breakage of the formed microbubble-finer mineral ore particle agglomerates.

Further, flotation cells with mechanical agitation and relatively large volume are capable of handling higher slurry feed rates and a wider range of particle sizes, thus improving the overall efficiency of the flotation line, as well as decreasing the need of energy-intensive grinding, as the slurry need not have particularly uniform particle size distribution to ensure recovery of the valuable material.

With a flotation line of the above embodiments, it may be possible to produce or recover at least some part of the concentrate with very high grade.

In case the first flotation cells have a relatively large volume, there may be no need for large subsequent flotation cells, but rather, the flotation cells downstream from the first primary cell or cells may be smaller and therefore more efficient. In flotation processes of certain minerals, it may be easy to float a significant part of the ore particles comprising valuable mineral with high grade. In that case it may be possible to have flotation cells of smaller volume downstream in the primary line and still achieve high recovery rate.

In an embodiment of the flotation line, the height, measured as the distance between a flotation cell bottom and launder lip, to diameter, measured at the height of the mechanical agitator, ratio of a flotation cell is 1.5 or lower.

By arranging flotation cells with such a height-to-diameter ratio, it becomes possible to ensure even and sufficient mixing of slurry within the flotation cell. The flotation gas bubble-mineral ore particle agglomerates are efficiently transferred to the froth zone as their ascent is not too long in the vertical direction of the flotation cell thus improving the recovery of valuable material. Further, the introduction of microbubbles into the flotation cell may be arranged to a zone or position within the flotation cell where the mixing effect of the mechanical agitator is less drastic and turbulence lower, further minimizing the above-mentioned risk of microbubble combining, but also minimizing the breakage of the formed microbubble-finer mineral ore particle agglomerates.

In an embodiment of the flotation line, the mechanical agitator comprises a rotor and a stator.

By arranging a stator in the mechanical agitator, it is possible to impede the transference of jet streams created by the rotor further away in the radial direction of the flotation cell. There is a high mixing area around the mechanical agitator, ensuring the creation of relatively large flotation gas bubble which efficiently entrap and lift mineral ore particles of larger particle sizes into the froth and finally concentrate, while closer to the perimeter of the flotation cell, a zone in which there is relatively low turbulence and less disruptive forces, ensures that the microbubbles introduced into the flotation cell may entrap ore particles with finer particle size, and the thus formed agglomerates maintain their coherence and are able to rise to the froth zone, as well.

In an embodiment of the flotation line, the stator comprises a system for introducing flotation gas into the flotation cell.

By introducing the flotation gas via the stator, the flotation gas bubbles may be larger in size. This means that mineral ore particles of even relatively large particle sizes may be trapped by the flotation gas bubbles, thereby improving the recovery of coarser ore particles.

In an embodiment of the flotation line, flotation gas is fed into a preparation flotation cell into which the mechanical agitator is arranged, and the preparation flotation cell comprises a microbubble generator.

By preparation flotation cell herein is meant a flotation vessel in which the slurry may be prepared for floating, typically by introducing flotation gas and by employing mechanical agitation, prior to the slurry being led into a second vessel where the actual flotation process takes place. The preparation flotation cell may, for example, be the first vessel of a dual flotation cell described earlier in this disclosure.

In an embodiment of the flotation line, the mineral ore particles comprise Cu, or Zn, or pyrite, or metal sulfide.

In an embodiment of the flotation line, the mineral ore particles comprise Cu from low-grade ore.

Copper is typically considered as easily floated mineral, which means that mineral ore particles comprising Cu with larger particle sizes may be efficiently recovered already in the rougher part of the flotation line. However, some of the valuable material may be comprised by the finer ore particles that may have, despite their comprising the valuable material, ended up in the underflow in the first rougher flotation cell(s). By introducing microbubbles into the later flotation cells or stages, also these finer particles comprising Cu may be efficiently recovered, thereby increasing the overall efficiency of the flotation line.

In an embodiment of the flotation line, the first flotation cell is arranged to treat mineral ore particles having a D80 of at least 75 μm.

In an embodiment of the flotation line, the first flotation cell is arranged to treat mineral ore particles having a D80 of less than 300 μm.

In an embodiment of the flotation line, the last flotation cell is arranged to treat mineral ore particles having a D80 of less than 200 μm.

By D80 herein is meant a maximum particle diameter below which 80% of the ore particles in slurry volume belong to, i.e. a 80 percentile of particle size measured as particle diameter.

The smaller the D80 value is, the finer the particle size. Microbubbles are particularly efficient in recovering finer mineral ore particles, as their size, 1 μm to 1 mm, is ideal for attachment to the finer particles.

In an embodiment of the flotation line, the microbubble generator is arranged to receive slurry from a bottom of a flotation cell via an outlet, and to return the slurry comprising microbubbles back into the flotation cell via at least one return inlet arranged above, in the vertical direction of the flotation cell, the outlet.

In an embodiment of the flotation line, the microbubble generator comprises a slurry recirculation system.

By taking slurry from the bottom of a flotation cell it is ensured that the finer mineral ore particles settled into the bottom of the flotation cell may be efficiently reintroduced into the part of the flotation tank where active flotation process takes place, before the finer particles are reported to tailings. Thus the recovery rate of valuable mineral is improved as the material comprising even minimal amounts of valuable mineral ore may be collected into the concentrate. By introducing the microbubbles into the slurry received from the bottom of the flotation cell prior to returning it to the cell, attachment of the microbubbles on the mineral ore particles may be facilitated. By returning slurry comprising microbubble-mineral ore particle agglomerates into the flotation cell at a position above the outlet, more specifically, above the mixing zone around the mechanical agitator at the bottom part of the flotation cell, the stability and retention of the agglomerates may be ensured, as the location is less turbulent and comprises less disruptive forces than the mixing zone. Also the length of ascent of the agglomerates into the froth zone is shorter, which may further improve recovery as the probability of the microbubble-ore particle agglomerates ending into the overflow and concentrate is increased, and the risk of back-drop into the bottom part of the flotation cell decreased.

In a typical mechanical flotation cell, that is a flotation cell with a mechanical agitator, the mechanical agitator, more specifically the rotor-stator assembly is employed to create turbulence in the bottom part of the flotation cell to prevent sanding and to facilitate the treatment of slurry with relatively high solids content (i.e. high percentage of mineral ore particles in weight of slurry). In view of introducing microbubbles into the slurry to improve the recovery of finer particles, mechanical agitation is, however, detrimental. As explained before, in the mixing zone the turbulence in the mixing zone not only prevents the microbubbles from attaching onto the finer particles, but also disrupts and breaks formed microbubble-mineral ore particle agglomerates. To overcome the negative effect of the mechanical agitation necessary for otherwise efficient flotation, in the flotation line according to the invention, microbubbles are introduces into the slurry by a microbubble generator comprising a slurry recirculation system arranged to generate microbubbles into slurry taken out of the flotation cell, more specifically out of the bottom part of the flotation cell, and reintroducing the slurry comprising microbubble-ore particle agglomerates back into the flotation cell at a position where the detrimental effect of mechanical agitation may be minimized, thus improving the recovery of the valuable material within the flotation line.

In an embodiment of the flotation line, the slurry recirculation system comprises a recirculation pump, arranged to intake slurry from a flotation cell via the outlet;

a distribution unit, arranged to distribute slurry evenly within the recirculation system;

a sparger assembly arranged to create microbubbles and cause attachment of microbubbles onto mineral ore particles in slurry, and further arranged to introduce the slurry back into the flotation cell via the return inlet; and a compressor or a blower arranged to feed compressed air/gas into the sparger assembly.

The slurry is recirculated from the bottom area of the flotation cell, as explained above, pumped into a distribution box for even distribution among spargers, which, in one embodiment, are located evenly and radially around the perimeter of the flotation cell. The slurry is then forced through the sparger in which air or other gas is added into the slurry via a compressor. The mixture is forced through tiny orifices which creates microbubbles, and at the same time, force the microbubbles to attach to the mineral ore particles in the recirculated slurry. The microbubble-ore particle agglomerates are then reintroduced back into the flotation cell to rise to the froth zone, thus reporting also the finer ore particles into overflow and the concentrate.

In yet another embodiment of the flotation line, the sparger assembly is arranged radially around the perimeter of the flotation cell.

By arranging the sparger assembly evenly and radially around the perimeter of the flotation cell, the reintroduction of slurry comprising microbubble-mineral ore particle agglomerates achieved evenly throughout the flotation cell, which improves the flotation efficiency further.

In an embodiment of the flotation line, the microbubble generator comprises a direct sparger system.

In yet another embodiment of the flotation line, the direct sparger system comprises a sparger assembly, arranged radially around the perimeter of the flotation cell, and further arranged to introduce microbubbles directly into the slurry within the flotation cell.

In yet another embodiment of the flotation line, the sparger assembly comprises jetting spargers, or cavitation spargers, or Venturi spargers.

Jetting spargers may be utilized around the perimeter of the flotation cell for the direct introduction of microbubbles with a size range of 0.5 to 1.2 mm. Especially if microbubbles are introduces in or near the turbulence zone (mixing zone), they may have higher probability of colliding with finer particles in the mixing zone, thus improving the reporting of those particles into the froth zone. Cavitation spargers or Venturi spargers may be utilized to introduce water and air or other flotation gas into the flotation cell by arranging cavitation spargers around the perimeter of the flotation cell for the introduction of microbubbles with a size range of 0.3 to 0.9 mm. In these embodiments, slurry is not recirculated, but air/gas or air/gas and water, respectively, will be introduced into the spargers to create microbubbles with a size range of 0.3 to 1.2 mm, injected directly into the flotation cell. The microbubbles attach to the finer mineral ore particles and increase the overall recovery of valuable mineral.

An embodiment of the use of a flotation arrangement according to the invention is particularly intended for recovering mineral ore particles comprising a valuable mineral from low grade ore.

An embodiment of the use of a flotation arrangement according to the invention is intended for recovering mineral ore particles comprising Cu from low grade ore.

In an embodiment of the flotation plant, the plant comprises at least two, or at least three flotation lines according to the invention.

In an embodiment of the flotation plant, a flotation line is arranged to recover mineral ore particles comprising Cu, and/or Zn, and/or pyrite, and/or a metal from a sulfide.

In an embodiment of the flotation plant, a flotation arrangement is arranged to recover mineral ore particles comprising Cu from low grade ore.

For example, in recovering copper from low grade ores obtained from poor deposits of mineral ore, the copper amounts may be as low as 0.1% by weight of the feed, i.e. infeed of slurry into the flotation line or plant. The flotation arrangement according to the invention may be very practical for recovering copper, as copper is a so-called easily floatable mineral. In the liberation of ore particles comprising copper, it may be possible to get a relatively high grade from the first (rougher) flotation cells.

By using the flotation line and plant according to the present invention, the recovery of such low amounts of valuable mineral, for example copper, may be efficiently increased, and even poor deposits cost-effectively utilized. As the known rich deposits have increasingly already been used, there is a need for processing the less favourable deposits as well, which previously may have been left unmined due to lack of suitable technology and processes for recovery of the valuable material in very low amounts in the ore.

In an embodiment of the flotation method according to the invention, microbubbles are generated into at least one flotation step preceding the last flotation step.

In an embodiment of the flotation method according to the invention, microbubbles are generated into all flotation steps preceding the last flotation step.

In yet another embodiment of the flotation method according to the invention, microbubbles are generated in at least one scavenger flotation step of the scavenger flotation stage.

In a further embodiment of the flotation method according to the invention, microbubbles are generated into all of the scavenger flotation steps of the scavenger flotation stage.

In an embodiment of the flotation method according to the invention, microbubbles are generated into the last flotation step.

In an embodiment of the flotation method according to the invention, microbubbles are generated by introducing slurry from a flotation step into a microbubble generator, and returning the slurry comprising microbubbles back into the flotation step.

In an embodiment of the flotation method according to the invention, the microbubbles are generated by recirculating the slurry.

BRIEF DESCRIPTION OF THE DRAWINGS

The accompanying drawings, which are included to provide a further understanding of the current disclosure and which constitute a part of this specification, illustrate embodiments of the disclosure and together with the description help to explain the principles of the current disclosure. In the drawings.

DETAILED DESCRIPTION

Reference will now be made in detail to the embodiments of the present disclosure, an example of which is illustrated in the accompanying drawing.

The description below discloses some embodiments in such a detail that a person skilled in the art is able to utilize the arrangement, plant and method based on the disclosure. Not all steps of the embodiments are discussed in detail, as many of the steps will be obvious for the person skilled in the art based on this disclosure.

For reasons of simplicity, item numbers will be maintained in the following exemplary embodiments in the case of repeating components.

Figure 1:
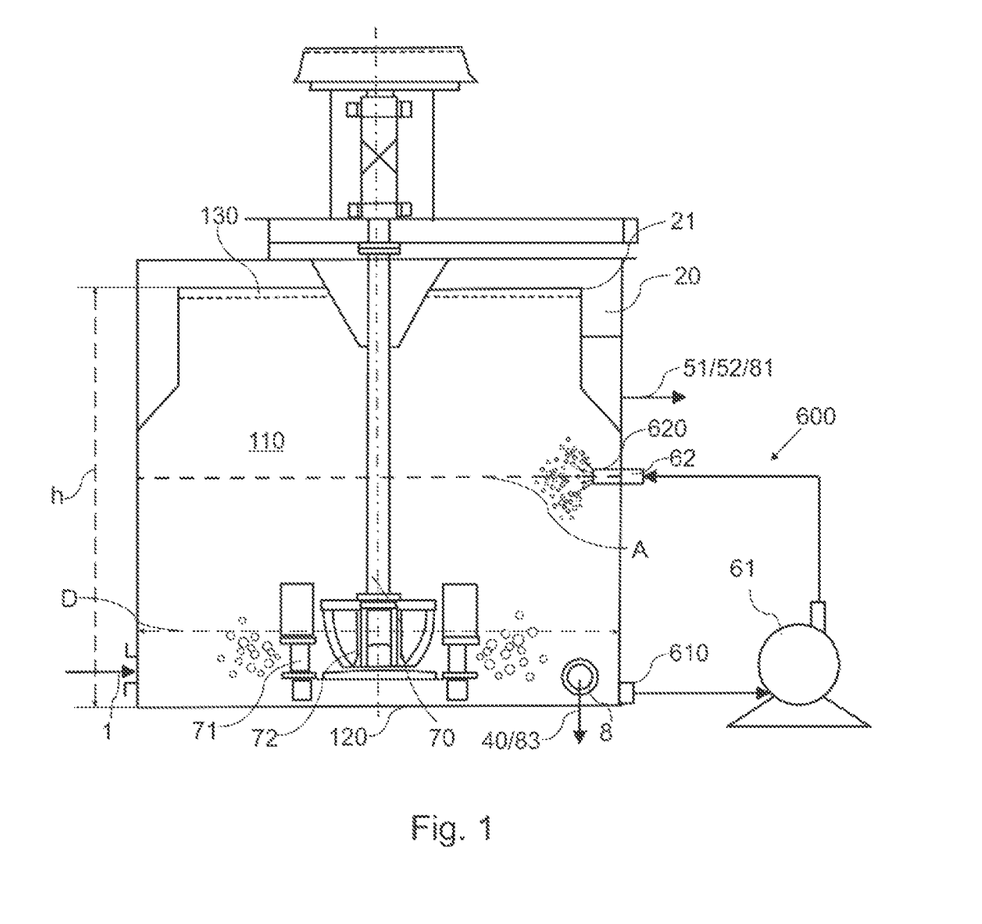
FIG. 1 illustrates a detail of an embodiment of the invention.
Figure 2:
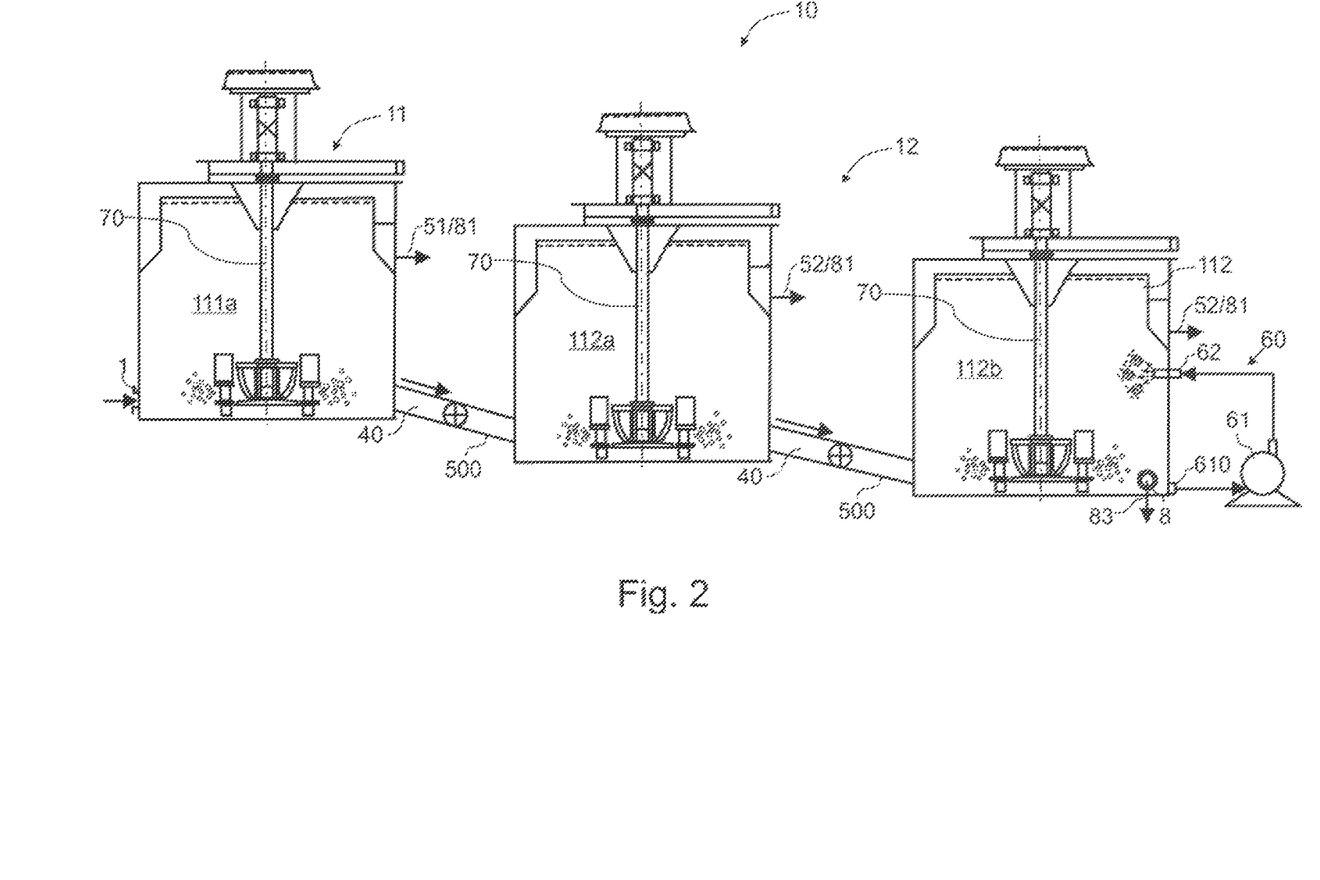
FIG. 2 is a simplified schematic illustration of a flotation line according to the invention.
Figure 3A:
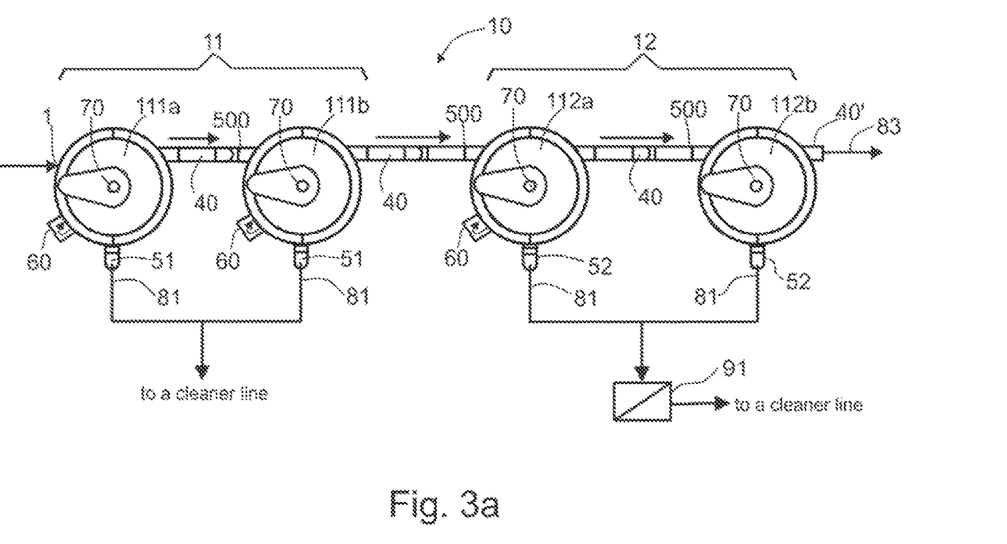
FIGS. 3a and 3b are flow chart illustrations for embodiments of the invention.
Figure 3B:
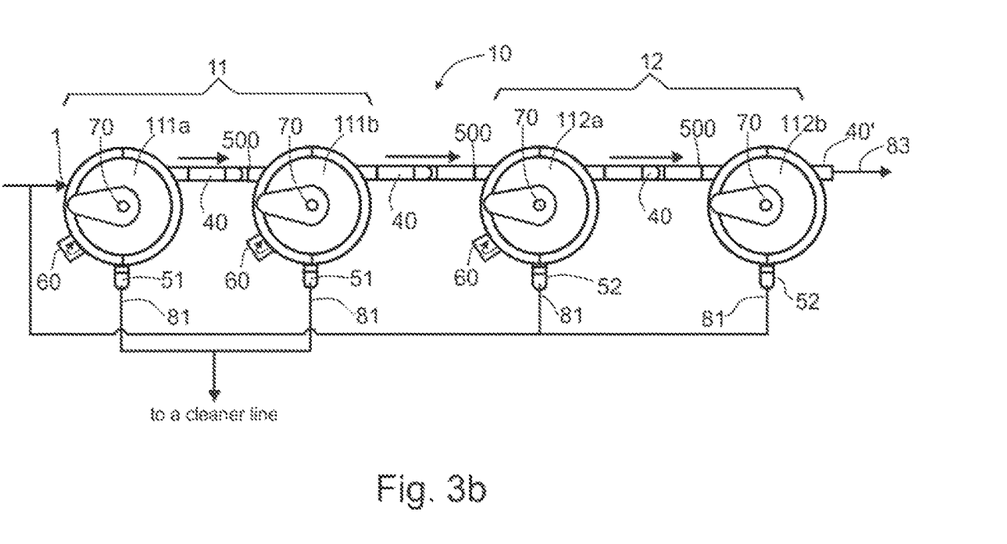

The enclosed FIGS. 2 and 3a, 3b illustrate a flotation line 10, and in FIG. 1, a flotation cell 110 is presented in some detail. The figures are not drawn to proportion, and many of the components of the flotation cell 110 and the flotation line 10 are omitted for clarity. The forward direction of flow of slurry is shown in the figures by arrows.

Although flotation is disclosed in the following examples by reference mostly to froth flotation, it should be noted that the principles according to the invention can be implemented regardless of the specific type of the flotation, i.e. the flotation technique can be any of the known per se flotation techniques, such as froth flotation, dissolved air flotation or induced gas flotation.

The basic operational principle of the flotation line 10 is presented in FIGS. 2 and 3a, 3b. The following description is to be read mainly in relation to those figures unless otherwise stated.

The flotation line 10 comprises a rougher part 11 with at least one rougher flotation cell 111a. From a rougher cell 111a, 111b overflow 51 is arranged to flow directly into a cleaner flotation line, which is a rougher cleaner flotation line. The flotation line 10 also comprises a scavenger part 12 with at least two scavenger flotation cells 112a, 112b. Overflow of a scavenger flotation cell 112a, 112b is arranged to flow back into a rougher flotation cell 111a, 111b (see FIG. 3b) or into a regrinding step 91 and then into a cleaner flotation line, which is a scavenger cleaner flotation line (see FIG. 3a). Underflow 40 from a flotation cell is arranged to be led into an adjacent flotation cell as infeed, i.e. a subsequent flotation cell is arranged to receive underflow 40 from a previous flotation cell. The flotation cells 111a-b, 112a-b are connected in series and arranged in fluid communication 500.

A first flotation cell 111a of the flotation line 10 receives a flow of suspension, that is, a slurry inflow 11 comprising ore particles, water and, in some instances, flotation chemicals such as collector chemicals and non-collector flotation reagents for separating the slurry into an underflow 40 and an overflow 50a. A typical flotation cell is presented in FIG. 1. The flotation cell comprises a mixer in the form of a mechanical agitator 70, for example a rotor 72—stator 71 assembly, as is shown in FIG. 1, or any other suitable mixer for promoting the collisions between flotation gas bubbles and ore particles. In an embodiment, the stator 71 comprises a system or assembly for introducing flotation gas into the flotation cell 110, 111a-b, 112a-b.

In an embodiment, flotation gas may be fed or introduced into the flotation cell where the slurry is separated into overflow and underflow. In an embodiment, flotation gas may be fed into a part of the flotation cell into which a mixer is arranged, i.e. into a preparation flotation cell preceding a flotation cell in which the ore particles are floated and thus separated into overflow and underflow. In this embodiment, the preparation flotation cell comprises a microbubble generator 60.

At least 75% of the flotation cells 111a-b, 112a-b of the flotation line comprise a mechanical agitator 70.

In a flotation process with flotation chemicals, a process of froth flotation takes place: the collector chemical molecules adhere to surface areas on ore particles having the valuable mineral, through an adsorption process. The valuable mineral acts as the adsorbent while the collector chemical acts as the adsorbate. The collector chemical molecules form a film on the valuable mineral areas on the surface of the ore particle. The collector chemical molecules have a non-polar part and a polar part. The polar parts of the collector molecules adsorb to the surface areas of ore particles having the valuable minerals. The non-polar parts are hydrophobic and are thus repelled from water. The repelling causes the hydrophobic tails of the collector molecules to adhere to flotation gas bubbles. An example of a flotation gas is atmosphere air pumped to flotation cell. A sufficient amount of adsorbed collector molecules on sufficiently large valuable mineral surface areas on an ore particle may cause the ore particle to become attached to a flotation gas bubble. It is also conceivable that the flotation process may be performed without flotation chemicals. In the following, the examples are disclosed in view of conventional flotation.

Ore particles become attached or adhered to gas bubbles to form gas bubble-ore particle agglomerates. These agglomerates rise to the surface of the flotation cells 110, 111*a-b*, 112*a-b* at the uppermost part or top part 130 of the cell 110 by buoyancy of the gas bubbles, as well as with the continuous upwards flow of slurry which may be induced by both mechanical agitation and the infeed of slurry into the cell 110*a-d*.

The gas bubbles form a layer of froth or forth zone at the top part 130 of the flotation cell 110. Froth gathered to a surface of slurry in the flotation cell 110, 111*a-b*, 112*a-b*, comprising the gas bubble-ore particle agglomerates is let to flow out of flotation cell, over a launder lip 21 and into a launder 20.

From the surface of the slurry at the top part 130 of the flotation cell 110*a-d*, the valuable mineral containing ore particles overflow the launder lip 21 of the flotation cell to be collected into the launder 20.

The valuable mineral containing ore particles overflowing the launder lip 21 is called primary overflow 50*a-d*. By a launder lip 21 is herein meant the peripheral edge of a flotation cell 110*a-d* at the upper part 112 of the cell over which froth overflow with valuable material particles flows to the launder 20.

Overflows 51, 52 from the flotation line 10 are recovered as a concentrate 81. The concentrate 81 of ore particles comprising valuable mineral is in a form of a fluid which may be led to further treatment. In an embodiment (see FIG. 3*a*), some or all of the overflows 52 from the scavenger part 12 of the flotation line 10 may be led directly into a regrinding step 91, followed by a subsequent flotation step comprising a cleaner flotation line, i.e. a cleaning circuit comprising a number of cleaner flotation cells (not shown in the figures). In an embodiment (see FIG. 3*b*), some or all of the overflows 52 from the scavenger part 12 may be led back into a rougher flotation cell 111*a*, 111*b*, to be treated again in the flotation line 10. Overflow 52 from one or more scavenger flotation cells 112*a-b* may be led back into a rougher flotation cell 111*a*, 111*b*, and at the same time, overflow 52 from other scavenger flotation cells 112*a-b* may be led directly to the regrinding step 91 (this embodiment is not shown in the figures). It is clear to a person skilled in the art, that any combination of arranging overflows 52 from the scavenger part 12 in the above-described manner is conceivable, according to the specific construction and use of the flotation line 10, even though only two specific embodiments are shown in FIGS. 3*a* and 3*b*.

From the area located close to a flotation cell bottom 120, a gangue or a part of the slurry containing ore particles that do not rise onto the surface of the slurry is led out of the rougher flotation cell 111*a* as underflow 40. Underflow 40 is led into a subsequent rougher flotation cell 111*b* (or a subsequent scavenger flotation cell 112*a*, see FIG. 2) that receives underflow 40 as an infeed from the previous rougher flotation cell 111*a*. The slurry is treated in the subsequent primary flotation cell 110*b* similarly as in the first primary flotation cell 110*a*, in a manner well known to a person skilled in the art.

The flotation line 10 may comprise at least three flotation cells 111*a-b*, 112*a-b*. Alternatively, the flotation line may comprise 3-10 flotation cells 111*a-b*, 112*a-b*. Alternatively, the flotation line 10 may comprise 4-7 flotation cells 111*a-b*, 112*a-b*. The rougher part 11 may comprise at least two rougher flotation cells 111*a-b*. Alternatively, the rougher part 11 may comprise 2-7 rougher flotation cells 111*a-b*. Alternatively, the rougher part 11 may comprise 2-5 rougher flotation cells 111*a-b*. Additionally or alternatively, the scavenger part 12 may comprise at least two scavenger flotation cells 112*a-b*, or 2-7 scavenger flotation cells 112*a-b*, or 2-5 scavenger flotation cells 112*a-b*.

The flotation cells 111*a-b*, 112*a-b* are connected in series and arranged in fluid communication 500. The fluid connection may be realized by a conduit (pipe or tube, as is shown in the figures) so that the neighboring flotation cells are arranged at a distance from each other. Alternatively, the at least two flotation cells 111*a-b*, 112*a-b* may be arranged into direct cell connection so that no separate conduit between the two flotation cells is needed (not shown in figures). In embodiments of the invention, where the flotation line 10 comprises more than two flotation cells, all of the adjacent or subsequent flotation cells of the flotation line 10 may be arranged into fluid connection 500 with conduits arranged between the flotation cells for directing underflow 40 from one flotation cell to the next flotation cell.

Alternatively, all of the flotation cells may be arranged into direct cell connection with the neighboring flotation cells. Alternatively, some of the adjoining flotation cells may arranged in direct cell connection with the neighboring flotation cells, while other neighboring flotation cells may have a conduit for realizing the fluid connection 500. The arrangement and design of the flotation line 10 may depend on the overall process requirements and physical location of the flotation line 10.

From the last flotation cell 112*b* of the flotation line 10, underflow 40 or reject is led out of the flotation line 10 as tailings 83.

The first flotation cell 111*a* of the flotation line 10 is at least 25 m$^3$ in volume. Alternatively, the first primary flotation cell 100*a* may be at least 100 m$^3$ in volume.

The second flotation cell 111*b*, or any one of the subsequent flotation cells 111*b*, 112*a-b* downstream of the first flotation cell 111*a*, is at least 25 m$^3$ in volume. Alternatively, the second flotation cell 111*b*, or any one of the subsequent flotation cells 111*b*, 112*a-b* downstream of the first flotation cell 111*a*, may be at least 100 m$^3$ in volume.

The flotation cells 111*a-b*, 112*a-b* are constructed to have certain dimensions. More specifically, a flotation cell has a height h, measured as the distance between the cell bottom 120 and the launder lip 21 (see FIG. 1); and a diameter D, measured at the height of the mechanical agitator 70. Typically, the cross-section of a flotation cell may be circular. In that case the diameter D is self-explanatory. However, the cross-section of a flotation may also be, for example, rectangular, square, triangular, hexagonal, pentagonal or other polygonal cross-sections, the form of the flotation cell cross-section defined by the side wall or walls of the flotation cell. In that case, the diameter D is to be understood as the maximum width of the flotation cell, measured from side wall-to-side wall at the height of the mechanical agitator 70. In an embodiment, the height h to diameter D ratio of the flotation cell is 1.5 or lower. In further embodiments, the h/D ratio may be 0.5; or 0.75; or 1.0; or 1.3.

Flows of slurry, both underflows 40 and overflows 51, 52 may be arranged to be driven by gravity. That is, any flow between any at least two flotation cells in fluid connection may be driven by gravity. For example, the underflow 40 flow of slurry between the first rougher flotation cell 111a and a further rougher flotation cell 111b or a scavenger flotation cell 112a may be driven by gravity.

To facilitate the movement by gravity of flows of slurry, at least some of the flotation cells 111a-b, 112a-b may be arranged in a stepwise fashion in relation to the ground level on which the flotation arrangement is established (see FIG. 2). Alternatively or additionally, the launder lips 21 of the flotation cells 110a-c, may be arranged at different heights. A step realised in between any adjacent flotation cell causes a difference in the froth layer level or launder lip 21 level of the two adjacent flotation cells. The gravitational flow of slurry is achieved by the hydraulic gradient between any two flotation cells with different slurry surface levels, realized with a step between the flotation cell bottoms 111.

In FIG. 1, the some of the constructional details of a flotation cell 110 are shown. Apart from the above-described features, the flotation cell 110 may comprise a microbubble generator 60 for introducing microbubbles into the slurry. More specifically, in the flotation line 10, at least one of the flotation cells comprising a mechanical agitator 70 comprise a microbubble generator 60. In an embodiment, at least one of the flotation cells 111a-b, 112a preceding, in the direction of flow, the last flotation cell 112b of the flotation line 10 comprises a microbubble generator 60. In an embodiment, alternatively or additionally, all of the flotation cells 111a-b, 112a preceding the last flotation cell 112b of the flotation line 10 comprise a microbubble generator 60 (see FIGS. 3a, 3b). In an embodiment, alternatively or additionally, the last flotation cell 112b of the flotation line 10 comprises a microbubble generator (see FIG. 2).

In an embodiment, at least one of the scavenger flotation cells 112a, 112b of the scavenger part 12 of the flotation line 10 comprises a microbubble generator 60. In an embodiment, alternatively or additionally, all of the scavenger flotation cells 112a-b comprise microbubble generators 60.

In an embodiment, the microbubble generator 60 is arranged to receive slurry from the bottom or bottom part 120 of the flotation cell via an outlet 610 situated near the bottom 120 of the cell. The microbubble generator is further arranged to return the slurry comprising microbubbles back into the flotation cell via at least one return inlet 620 arranged above the outlet 610. "Above" is intended to mean a position higher up in the vertical direction of the flotation cell 110, and preferably (although not necessarily) a position outside the mixing zone in the immediate vicinity of the mechanical agitator and/or at the level of the mechanical agitator indicated by the line D in FIG. 1.

The microbubble generator 60 may comprise a slurry recirculation system 600. In an embodiment, the slurry recirculation system 600 comprises a recirculation pump 61 arranged to intake slurry from a flotation cell 110, 111a-b, 112a-b via the outlet 610; a distribution unit, such as a distribution box (not shown in the figures), arranged to distribute slurry evenly within the recirculation system 600; a sparger assembly 62 arranged to created microbubbles and cause attachment of microbubbles onto mineral ore particles in slurry, and further arranged to introduce slurry back into the flotation cell via the return inlet 620. The slurry recirculation system 600 further comprises a compressor or a blower (not shown in the figures) arranged to feed compressed air or gas into the sparger assembly 62. In an embodiment, the sparger assembly is arranged radially around the perimeter of the flotation tank. For example, the sparger assembly may comprise a number of radially placed spargers spaced evenly around the perimeter of the flotation tank.

In an embodiment, the microbubbles may be introduced into a flotation cell 110, 111a-b, 112a-b by a microbubble generator 60 comprising a direct sparger system. In a direct spargers system, slurry is not recirculated, but air/gas or air/gas and water is introduced directly into the flotation cell via a sparger assembly 62. In an embodiment, the direct sparger system comprises a sparger assembly 62 arranged radially and evenly around the perimeter of the flotation cell, and arranged to introduce microbubbles directly into the slurry within the flotation cell.

In all of the above embodiments, the sparger assembly may comprise a variety of spargers, for generating an appropriate microbubble size distribution by injecting air into the recirculated slurry, or directly to the slurry. For example, a jetting sparger (such as SonicSparger™ Jet), based on ultrasonic injection of air or air and water, may be utilized. Another example of a sparger is a cavitation or Venturi sparger (such as SonicSparger™ Vent), the operation of which is based on the Venturi principle which is highly efficient in generating large amount microbubbles with relatively small size (0.3-0.9 mm). In a cavitation sparger, a recirculate of slurry from the flotation cell is forced through the sparger to generate bubbles through cavitation. In addition, air may be injected to ensure good microbubble generation.

The flotation line 10 according to the invention is intended for treating mineral ore particles comprising copper (Cu), zinc (Zn), pyrite, or a metal sulfide. The flotation line 10 is especially intended for treating mineral ore particles comprising copper from low-grade ore.

The first flotation cell, that is, the first rougher flotation cell 111a is arranged to treat mineral ore particles having a D80 of at least 75 μm. Alternatively or additionally, the first flotation cell, that is, the first rougher flotation cell 111a is arranged to treat mineral ore particles having a D80 of less than 300 μm. Alternatively of additionally the last flotation cell, that is, the last scavenger flotation cell 112b is arranged to treat mineral ore particles having a D80 of less than 200 μm.

The flotation line 10 described herein is particularly suitable for, but not limited to, use in recovering valuable mineral containing ores, where the mineral ore particles comprise Cu, Zn, pyrite, or a metal sulfide such as gold sulfide. The flotation line 10 is suitable for use in recovering mineral ore particles comprising a valuable mineral, particularly from low grade ore. The flotation line 10 is particularly suitable for recovering mineral ore particles comprising Cu from low grade ore.

Figure 4:
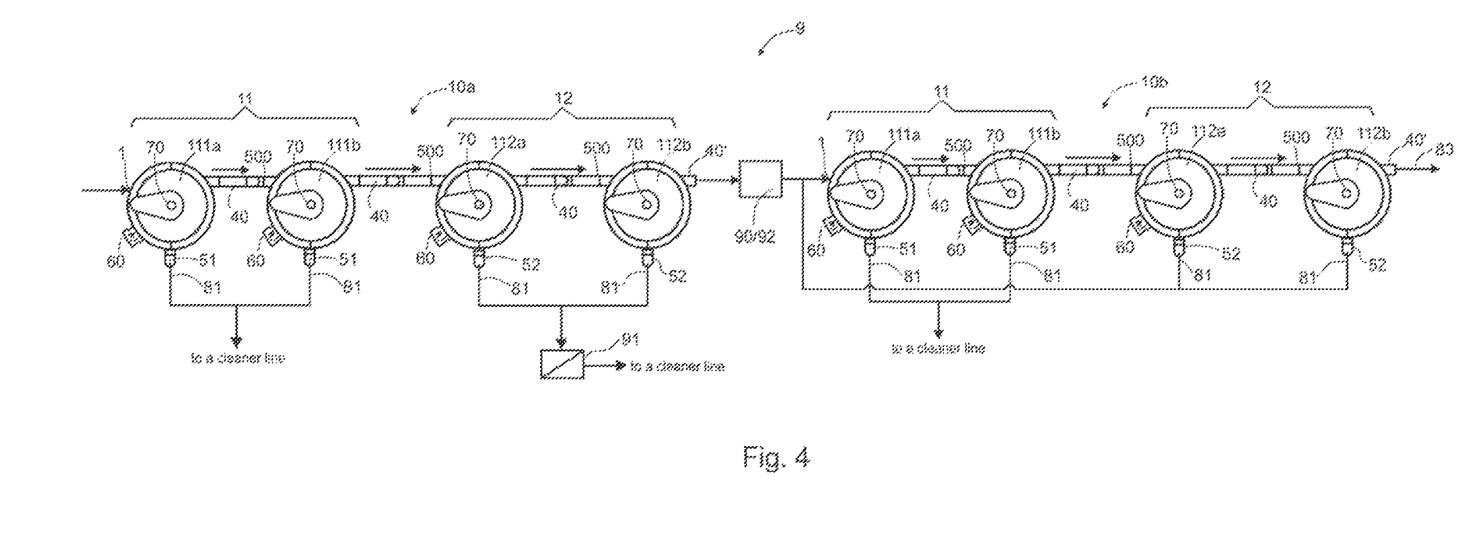
FIG. 4 is a flow chart illustration for an embodiment of a flotation plant according to an embodiment of the invention.

According to a further aspect of the invention, a flotation plant 9 (see FIG. 4) may comprise a flotation line 10 arranged to recover Cu. Alternatively or additionally, the flotation plant 9 may comprise a flotation line 10 arranged to recover Zn. Alternatively or additionally, the flotation plant 9 may comprise a flotation line 10 arranged to recover pyrite. Alternatively or additionally, the flotation plant 9 may comprise a flotation line 10 arranged to recover a metal from a sulfide. According to a further embodiment of the invention, the flotation plant 9 may comprise a flotation line 10 arranged to recover mineral ore particles comprising Cu from low grade ore.

In an embodiment, the flotation plant 9 may comprise at least two, or at least three flotation arrangements 1 according to the invention.

According to an embodiment of the invention, the flotation plant 9 may comprise at least one first flotation line 10a for the recovery of a first concentrate 81, and at least one second flotation line 10b for the recovery of a second concentrate 82. In an embodiment, the flotation cells 111a-b, 112a-b of the at least one first flotation line 10a for the recovery of the first concentrate 81 and the flotation cells 111a-b, 112a-b of the at least one second flotation line 10b for the recovery of the second concentrate 82 are arranged in series. In that way, underflow 40' from the last flotation cell 112a of the first flotation line 10a is arranged to be led to the second flotation line 10b as an infeed 1.

The flotation plant 9 may further comprise an arrangement for further treating the mineral ore particles suspended in slurry so that the second concentrate 82 is different from the first concentrate 81. In an embodiment, the arrangement for further treating the mineral ore particles may be a grinding step 90 disposed between a first flotation line 10a and a second flotation line 10b. In an embodiment, the arrangement for further treating the mineral ore particles may be an arrangement 92 for the addition of flotation chemicals, disposed between a first flotation line 10a and a second flotation line 10b.

According to another aspect of the invention, a flotation method for treating mineral ore particles suspended in slurry is presented. In the method, slurry is subjected to a rougher flotation stage 11 with at least one rougher flotation step 111a, wherein slurry is separated into underflow 40 and overflow 51 with the help of flotation gas. Overflow 51 from a rougher flotation step 111a, 111b is led to flow directly into a cleaner flotation stage; underflow 40 from the rougher flotation stage is led to a scavenger flotation stage 12 with at least two scavenger flotation steps 112a, 112b wherein slurry is separated into underflow 40 and overflow 52 with the help of flotation gas; overflow 52 from a scavenger flotation step 112a, 112b is led to flow back into a rougher flotation step 111a, 111b of the rougher flotation stage 11, or into a regrinding step 91 and then into a cleaner flotation stage The slurry is mechanically agitated in at least 75% of the flotation steps which are in series and have fluid communication 500. Underflow 40 from a previous flotation step is led into a subsequent flotation step. Overflow 51, 52 comprises a concentrate 81 and underflow 40, 40' comprises tailings 83. In the method, microbubbles are generated into the slurry in at least one of the flotation steps in which the slurry is mechanically agitated.

In an embodiment, microbubbles are generated into at least one flotation step 111a-b, 112a preceding the last flotation step 112b. Alternatively or additionally, microbubbles may be generated into all flotation steps 111a-b, 112a preceding the last flotation step 112b.

In an embodiment, microbubbles are generated in at least one scavenger flotation step 112a of the scavenger flotation stage 12. Alternatively or additionally, microbubbles may be generated into all of the scavenger flotation steps 112a-b of the scavenger flotation stage 12. Alternatively or additionally, microbubbles may be generated into the last flotation step 112b.

In an embodiment, microbubbles may be generated by introducing slurry from a flotation step into a microbubble generator 60, and returning the slurry comprising microbubbles back into the flotation step.

In an embodiment, the microbubbles are generated by recirculating the slurry.

The embodiments described hereinbefore may be used in any combination with each other. Several of the embodiments may be combined together to form a further embodiment. An arrangement, a method, a plant or a use, to which the disclosure is related, may comprise at least one of the embodiments described hereinbefore. It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A flotation line for treating mineral ore particles suspended in slurry, comprising a rougher part with at least one rougher flotation cell for the separation of slurry into underflow and overflow with the help of flotation gas, the overflow from the at least one rougher flotation cell arranged to flow directly into a cleaner flotation line; and a scavenger part with at least two scavenger flotation cells for the separation of slurry into underflow and overflow with the help of flotation gas, wherein the overflow from the at least two scavenger flotation cells is arranged to flow back into the at least one rougher flotation cell of the rougher part of the flotation line, or into a regrinding step and then into the cleaner flotation line;

the underflow of each preceding flotation cell of the flotation line is directed to a subsequent flotation cell of the flotation line as infeed until a last flotation cell of the flotation line, the last flotation cell being a last scavenger flotation cell of the at least two scavenger flotation cells the underflow of which is directed out of the line as tailings, at least 75% of the flotation cells in the flotation line comprise a mechanical agitator comprising a rotor, a stator, and a system for introducing the flotation gas into the flotation cell;

the flotation cells of the flotation line are connected in series and arranged in fluid communication; and wherein at least one of the flotation cells comprising the mechanical agitator comprises a microbubble generator for introducing microbubbles into the slurry, and that the underflow from a previous flotation cell is arranged to be led into the subsequent flotation cell by gravity, and the microbubble generator is arranged to receive slurry from a bottom of a flotation cell via an outlet located in a side wall at the lowest part of the flotation cell, and to return the slurry comprising microbubbles back into the flotation cell via at least one return inlet arranged above, in the vertical direction of the flotation cell, the outlet.

2. The flotation line according to claim 1, wherein overflows of the flotation cells comprise a concentrate, and underflows of the flotation cells are arranged to flow into the tailings.

3. The flotation line according to claim 1, wherein at least one of the flotation cells preceding the last flotation cell of the flotation line comprises the microbubble generator.

4. The flotation line according to claim 1, wherein all flotation cells preceding the last flotation cell of the flotation line comprise the microbubble generator.

5. The flotation line according to claim 1, wherein at least one of the scavenger flotation cells of the scavenger part of the flotation line comprises the microbubble generator.

6. The flotation line according to claim 1, wherein all of the scavenger flotation cells of the scavenger part of the flotation line comprise microbubble generators.

7. The flotation line according to claim 1, wherein the last flotation cell of the flotation line comprises the microbubble generator.

8. The flotation line according to claim 1, wherein the flotation line comprises at least three flotation cells, or 310 flotation cells, or 47 flotation cells.

9. The flotation line according to claim 1, wherein the rougher part comprises at least two rougher flotation cells, or 27 rougher flotation cells, or 25 rougher flotation cells.

10. The flotation line according to claim 1, wherein the scavenger part comprises at least two scavenger flotation cells, or 27 scavenger flotation cells, or 25 scavenger flotation cells.

11. The flotation line according to claim 1, wherein the first flotation cell of the flotation line is at least 25 m3 in volume, or at least 100 m3 in volume.

12. The flotation line according to claim 1, wherein a second flotation cell of the flotation line is at least 25 m3 in volume, or at least 100 m3.

13. The flotation line according to claim 1, wherein the height, measured as the distance between a flotation cell bottom and launder lip, to diameter, measured at the height of the mechanical agitator, ratio of a flotation cell is 1.5 or lower.

14. The flotation line according to claim 1, wherein the stator comprises a system for introducing the flotation gas into the flotation cell.

15. The flotation line according to claim 1, wherein the flotation gas is fed into a preparation flotation cell into which the mechanical agitator is arranged, and the preparation flotation cell comprises the microbubble generator.

16. The flotation line according to claim 1, wherein the mineral ore particles comprise Cu, or Zn, or pyrite, or metal sulfide.

17. The flotation line according to claim 1, wherein the mineral ore particles comprise Cu from lowgrade ore, wherein Cu from low grade ore amount is 0.1% by weight.

18. The flotation line according to claim 1, wherein the first flotation cell is arranged to treat mineral ore particles having a D80 of at least 75 μm.

19. The flotation line according to claim 1, wherein the first flotation cell is arranged to treat mineral ore particles having a D80 of less than 300 μm.

20. The flotation line according to claim 19, wherein the last flotation cell is arranged to treat mineral ore particles having a D80 of less than 200 μm.

21. The flotation line according to claim 1, wherein the microbubble generator comprises a slurry recirculation system.

22. The flotation line according to claim 21, wherein the slurry recirculation system comprises
a recirculation pump, arranged to intake slurry from a flotation cell via the outlet;
a distribution unit, arranged to distribute slurry evenly within the recirculation system;
a sparger assembly arranged to create microbubbles and cause attachment of microbubbles onto mineral ore particles in slurry, and further arranged to introduce the slurry back into the flotation cell via the return inlet; and
a compressor or a blower arranged to feed compressed air/gas into the sparger assembly.

23. The flotation line according to claim 22, wherein the sparger assembly is arranged radially around the perimeter of the flotation cell.

24. The flotation line according to claim 1, wherein the microbubble generator comprises a direct sparger system.

25. The flotation line according to claim 24, wherein the direct sparger system comprises a sparger assembly, arranged radially around the perimeter of the flotation cell, and further arranged to introduce microbubbles directly into the slurry within the flotation cell.

26. The flotation line according to claim 25, wherein the sparger assembly comprises jetting spargers, or cavitation spargers, or Venturi spargers.

27. A flotation plant comprising a flotation line according to claim 1.

28. The flotation plant according to claim 27, wherein the plant comprises at least two, or at least three flotation lines.

29. The flotation plant according to claim 27, wherein a flotation line is arranged to recover mineral ore particles comprising Cu, and/or Zn, and/or pyrite, and/or a metal from a sulfide.

30. The flotation plant according to claim 27, wherein a flotation arrangement is arranged to recover mineral ore particles comprising Cu from low grade ore, wherein Cu from low grade ore amount is 0.1% by weight.

31. A method of recovering mineral ore particles comprising a valuable mineral, the method comprising utilizing a flotation line according to claim 1.

32. The method according to claim 31, wherein the mineral ore particles comprise Cu.

33. A method for treating mineral ore particles suspended in slurry, wherein
the slurry is subjected to a rougher flotation stage with at least one rougher flotation step wherein slurry is separated into underflow and overflow with the help of a flotation gas;
the overflow from a rougher flotation step is led to flow directly into a cleaner flotation stage;
the underflow from the rougher flotation stage is led to a scavenger flotation stage with at least two scavenger flotation steps wherein slurry is separated into underflow and overflow with the help of a flotation gas;
the overflow from a scavenger flotation step is led to flow back into a rougher flotation step of the rougher flotation stage of the flotation line, or into a regrinding step and then into a cleaner flotation stage;
the slurry is mechanically agitated using a mechanical agitator comprising a rotor, a stator, and a system for introducing flotation gas into a flotation cell in at least 75% of the flotation steps;
the flotation steps are in series and have fluid communication;
the underflow from a previous flotation step is led into a subsequent flotation step; and
the overflow comprises a concentrate and the underflow comprises tailings, wherein
microbubbles are generated into the slurry in at least one of the flotation steps in which the slurry is mechanically agitated, and that the underflow from a previous flotation step is led into a subsequent flotation step by gravity, and the microbubbles are generated by introducing slurry from the at least one of the flotation steps via an outlet located in a side wall at the lowest part of the flotation cell and arranged at a bottom of a flotation cell into a microbubble generator, and returning the slurry comprising microbubbles back into the flotation step via at least one return inlet arranged above, in the vertical direction of the flotation cell, the outlet.

34. The method according to claim 33, wherein microbubbles are generated into at least one flotation step preceding the last flotation step.

35. The method according to claim 33, wherein microbubbles are generated into all flotation steps preceding the last flotation step.

36. The method according to claim 33, wherein microbubbles are generated in at least one scavenger flotation step of the scavenger flotation stage.

37. The method according to claim 33, wherein microbubbles are generated into all of the scavenger flotation steps of the scavenger flotation stage.

38. The method according to claim 33, wherein microbubbles are generated into the last flotation step.

39. The method according to claim 33, wherein the microbubbles are generated by recirculating the slurry.

* * * * *